United States Patent
Manfrida et al.

(10) Patent No.: US 11,193,453 B2
(45) Date of Patent: Dec. 7, 2021

(54) REGASIFICATION APPARATUS FOR THE SUPPLY OF VEHICLES' ENDOTHERMIC ENGINES

(71) Applicant: Universita' Degli Studi di Firenze, Florence (IT)

(72) Inventors: Giampaolo Manfrida, Florence (IT); Daniele Fiaschi, Sarteano (IT)

(73) Assignee: Universita' Degli Studi di Firenze, Florence (IT)

( * ) Notice: Subject to any disclaimer, the term of this patent is extended or adjusted under 35 U.S.C. 154(b) by 47 days.

(21) Appl. No.: 16/757,203

(22) PCT Filed: Oct. 17, 2018

(86) PCT No.: PCT/IB2018/058040
§ 371 (c)(1),
(2) Date: Apr. 17, 2020

(87) PCT Pub. No.: WO2019/077511
PCT Pub. Date: Apr. 25, 2019

(65) Prior Publication Data
US 2021/0131382 A1    May 6, 2021

(30) Foreign Application Priority Data

Oct. 17, 2017  (IT) .................. 102017000117283

(51) Int. Cl.
*F02M 21/06* (2006.01)
*F02M 21/02* (2006.01)
(Continued)

(52) U.S. Cl.
CPC ........ *F02M 21/06* (2013.01); *F02M 21/0209* (2013.01); *F02M 21/0224* (2013.01); *F02M 31/16* (2013.01); *F02M 31/20* (2013.01)

(58) Field of Classification Search
CPC .............. F02M 21/06; F02M 21/0221; F02M 21/0224; F02M 21/0287; F02B 29/0412;
(Continued)

(56) References Cited

U.S. PATENT DOCUMENTS 4,315,407 A * 2/1982 Creed .................. F17C 9/04
62/50.2
5,375,580 A   12/1994 Stolz et al.
(Continued)

FOREIGN PATENT DOCUMENTS

CN       105716345       6/2006
CN       204301358 U  *  4/2015
(Continued)

OTHER PUBLICATIONS

International Search Report dated Dec. 21, 2018.
(Continued)

*Primary Examiner* — Michael A Kessler
(74) *Attorney, Agent, or Firm* — Preston Smirman; Smirman IP Law, PLLC

(57) ABSTRACT

A regasification apparatus includes a closed loop heat transfer fluid circulation assembly, for the storage of the cold energy extracted from fuel during its regasification, and provides: a first tank, for containing at ambient temperature the heat transfer fluid, and an insulated second tank where the latter is kept cold; a fluid/fluid heat exchanger, defining the heating means, in which the fluid, coming out of the first tank, is placed in heat transfer with the cold branch of the pipe and therefore cooled, then stored in the second tank. From the latter departs at least one insulated branch, to supply with cold fluid at least one utility present in the aforementioned vehicle, for example an air/fluid heat exchanger located downstream an intercooler of the engine. By means of a pipe, the heat transfer fluid, heated back to ambient temperature, returns to the first tank.

10 Claims, 1 Drawing Sheet

(51) Int. Cl.
*F02M 31/16* (2006.01)
*F02M 31/20* (2006.01)

(58) Field of Classification Search
CPC .......... F02B 29/0443; F17C 2223/0161; F17C 2227/0309
See application file for complete search history.

(56) References Cited

U.S. PATENT DOCUMENTS

| | | |
|---|---|---|
| 5,390,646 A | 2/1995 | Swenson |
| 2014/0174709 A1 | 6/2014 | Fiveland |
| 2019/0331298 A1* | 10/2019 | Thor .......................... F17C 9/04 |

FOREIGN PATENT DOCUMENTS

| | | | |
|---|---|---|---|
| CN | 205112931 | 3/2016 | |
| DE | 102006042054 | 3/2008 | |
| FR | 2773115 A1 * | 7/1999 | ........... B60H 1/3202 |

OTHER PUBLICATIONS

Written Opinion of International Searching Authority dated Dec. 21, 2018.
International Preliminary Report on Patentability dated Oct. 2, 2019.
English Abstract of DE102006042054.
English Abstract of CN105716345.
English Abstract of CN205112931.

* cited by examiner

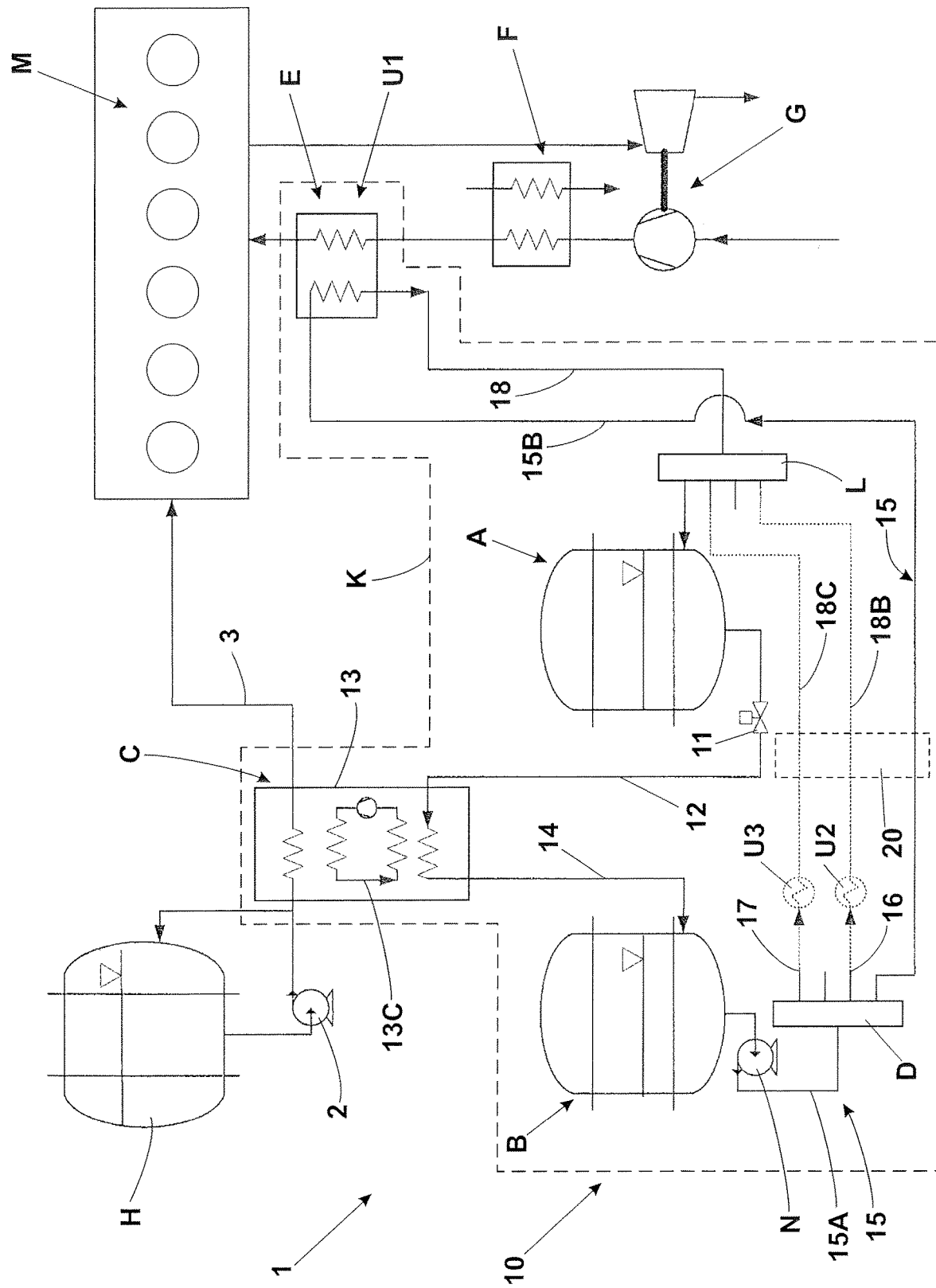

REGASIFICATION APPARATUS FOR THE SUPPLY OF VEHICLES' ENDOTHERMIC ENGINES

CROSS-REFERENCE TO RELATED APPLICATION

The instant application is a national phase of PCT International Application No. PCT/IB2018/058040, filed Oct. 17, 2018, and claims priority to Italian Patent Application Serial No. 102017000117283, filed Oct. 17, 2017, the entire specifications of both of which are expressly incorporated herein by reference.

TECHNICAL FIELD

The invention is in the technical field concerning fuel supply means of endothermic engines using natural gas as a fuel.

In particular, the field of application for large industrial vehicles, such as trucks, buses, earth-moving machines and the like and even agricultural tractors, is considered.

STATE OF THE ART

As known, for the majority of the aforementioned vehicles, the use of Diesel engines, fuelled by diesel oil, is widely spread.

Environmental concerns have led to a progressive tightening of the anti-pollution regulations that vehicle manufacturers must comply with.

Recent worldwide known scandals have imputed the Diesel engines in general, and as to technical reasons add up the political choices, a drastic contraction of this type of endothermic engine in cars is expected in the near future.

The regulations have already included for a few years, among the emissions to be checked during the engine's approval, those relating to nitrogen oxides, which Diesel engines produce to a greater extent than gasoline or gas engines, due to the fact that combustion takes place in excess of air with higher temperatures.

Law limits for these harmful substances will gradually be made more stringent and, as known to experts in motor engineering, are very difficult to meet for big sized diesel engines such as those used in industrial vehicles, agricultural vehicles and vehicles used for public transport.

Therefore, even for the above mentioned kind of vehicle, manufacturers are looking for alternative solutions, which in the current state of the art are focused on the use of natural gas or methane gas, as already occurred in the sector of light commercial vehicles.

For large vehicles, two roads are currently being followed:
  the first which envisages the use of spontaneous ignition Diesel engines, fuelled with dual fuel, natural gas for about 85% and diesel for the remaining 15%; at start-up and at idle the engine operates with diesel only;
  the second one that provides an Otto-cycle engine, with spark ignition, which always works with natural gas only.

The latter seems to be the favourite for a series of uses, also considering the lower noise pollution produced by this engine compared to a Diesel.

While in cars and light commercial vehicles the natural gas that is brought on board is compressed to about 200 bar in special cylinders, offering a discrete autonomy, for the aforesaid industrial and agricultural vehicles that have much higher fuel consumption, this solution is insufficient right under this aspect and cannot be remedied by increasing the number of cylinders due to the excessive weight and dimensions.

For these reasons, recent studies are directed towards a solution in which methane is stored in cryogenic cylinders at a temperature of at least 150-160° C. below zero so that the fuel is in the liquid state: in this way, it is possible to store a large amount of fuel in a small volume, so that sufficient autonomy can be achieved.

Regardless of the technical problems to overcome in order to adopt such cryogenic cylinders, it is established that the natural gas stored at such temperatures has to be treated to bring it back into a gaseous form and at an acceptable temperature previous to be fed to the vehicle's endothermic engine.

Conventionally, this occurs in a heat exchanger which, by using the heat produced by the engine itself, for example by means of the cooling liquid exiting the cylinder head, provides for heating the fuel.

In this way, the needs of the engine are met but the possibility is lost of recovering the cold energy contained in the cold resource, i.e. in the liquid gas at −150/−160° C., that can be potentially converted into work energy (exergy). According to an estimate, the energy loss is roughly calculated in about 8-10% of the calorific value of the fuel.

For stationary applications, where the regasification is aimed at the introduction of gas into the pipelines and also in some large ships for the transportation of methane, solutions have already been experimented for the recovery of said exergy, also through the use of heat transfer fluids.

Also in the field of industrial vehicles, solutions have been devised which aim to use the cold energy recovered from the process of heating the fuel taken from the cryogenic tank before it feeds the vehicle's engine.

In document CN105716345A a system is described for the recovery of the cold energy of liquefied natural gas destined to feed the engine of a truck, then using the recovered cold energy for the refrigerating system of a cold room housed in the truck itself. The system includes a direct and an indirect cold recovery subsystems. With the direct subsystem, the recovered cold energy is used to cool the cold room when there is a load to be kept inside it. The indirect subsystem makes it possible to store part of the cold energy which is not immediately necessary for subsequent moments, when more cooling is needed or when the engine is switched off, or if the cold room is temporarily set apart from the tractor, or alternatively, for increasing the engine performance in terms of power and specific fuel consumption (and therefore also with advantages at reducing polluting emissions). In fact, the possibility of decreasing the intake air temperature allows the engine to increase power by reducing the specific consumption (thus improving efficiency and reducing emissions) and can be particularly advantageous in cases where there is a need for greater air supply, also in relation to the path followed by the vehicle. The system can be excluded when there is no load in the cold room and in this case the cold energy is not recovered. The above exposed solution defines a single possible use of recovered exergy and, where this is not necessary due to lack of load to keep refrigerated, it allows, at most, to store a portion of the cold energy but with the same intended use.

In another prior document, CN205112931U, it is proposed to use the cold energy recovered during the regasification process to serve the vehicle cab's conditioning system. Also in this case the use of cold energy is only for a single purpose and, even considering thermal dispersions, appears to be disproportionate starting from a temperature of −150° C. to obtain a temperature of the air blowing from the air-conditioning system outlet vents of 5-6° C.

In the prior document U.S. Pat. No. 5,390,646, an air and fuel supply system is proposed for an internal combustion engine supplied with a cryogenic liquid, in which the cold energy subtracted to the fuel to perform its regasification is used to cool the combustion air supplied to the engine by an auxiliary intercooler device or aftercooler. The transfer of cold energy from the fuel to the air is performed by means of a heat transfer fluid that circulates in a closed loop system. Heat transfer fluid is here a phase change refrigerant fluid that evaporates in the aftercooler and condenses when exchanging heat with the fuel. In the document, it is suggested the use of propane as heat transfer fluid as it has suitable physical characteristics. The use of a phase changing heat transfer fluid allows to transfer large amounts of energy even with limited quantities of heat transfer fluid. However, the management of the phase change leads to structural complications of the circuit thereof since the circuit must be provided with proper separation means to keep the liquid phase separate from the gaseous phase, with the separations means that must be correctly dimensioned and managed during the transients of the engine, which are relevant in the automotive applications. One of these containers is an integral part of the aftercooler device where the heat transfer fluid heated by the combustion air must have room to evaporate. In addition to the structural complexity of such indirect heat transfer circuit, a limitation of the present application consists in the fact that the cold energy subtracted from the fuel during regasification must be used immediately for the cooling process of the combustion air and it can not be exploited for a delayed use.

SUMMARY OF THE INVENTION

An object of the present invention is therefore to propose a regasification device for the supplying of fuel to vehicles' endothermic engines, that is equipped with a closed loop heat transfer fluid circuit able to keep the cold energy subtracted to the fuel during said regasification stored, and to manage it for supplying cold energy to one or more users on board of the vehicle, according to variable and selectable modes.

Another object of the invention is to provide the aforesaid regasification device so that it is possible to draw the recover the maximum amount of cold energy end to keep it stored with a limited heat loss.

Another object of the invention is to manage the use of the stored cold energy according to the real needs of the users, with the least possible waste, so as to obtain, on the whole, a high efficiency.

A further object of the invention is to provide a system in which the aforesaid regasification device can be interfaced with remote devices such as smartphones and the like, in order to obtain and/or enter data, information and commands.

Another further object of the invention is to provide a regasification device providing a managing unit that can be connected to on-board systems capable of providing useful information to optimize the use of the recovered cold energy.

These and other objects are fully achieved by means of a regasification apparatus for the supply of vehicles' endothermic engines of the type in which they are provided: at least one cryogenic cylinder for the storage, in liquid form, of a fuel gas mixture; heating means, interposed along a pipe connecting said cryogenic cylinder with the fuel supply system of said engine, intended to heat the fuel gas mixture in liquid form from the sub-zero temperature at which it is taken, to bring it back in gaseous state at a temperature compliant with the fuel supply system of the same engine, said apparatus comprising a closed loop heat transfer fluid circulation assembly where an antifreeze heat transfer fluid is circulated for the storage of cold energy extracted from said fuel gas mixture during said heating phase; in said assembly being provided:

- a first tank, adapted to store, at room temperature, said heat transfer fluid in liquid phase;
- means for withdrawal, with controlled flow rate, said heat transfer fluid from said first tank and for flowing it through a first pipe;
- a fluid/fluid heat exchanger, defining said heating means and arranged downstream of said first pipe, in which the said heat transfer fluid exchange heat with a cold branch of the said pipe between the cryogenic cylinder and the fuel supply system of the engine, thereby lowering its temperature;
- a insulated second tank adapted to store said heat transfer fluid;
- an insulated second pipe, exiting from said fluid/fluid heat exchanger, for the transport of the cold heat transfer fluid to said second tank;
- at least one insulated derivative pipe, connected to said second tank, for receiving cold heat transfer fluid and sending it to a user present in said vehicle in which a cooling action is required, said user being not in thermal contact with said first and second tanks;
- at least a third pipe, connected downstream of said user, for returning the heat transfer fluid, heated back to ambient temperature, into said first tank.

BRIEF DESCRIPTION OF THE DRAWINGS

The characteristics of the invention will be clear from the following description of a preferred embodiment of the main elements of a regasification apparatus for the supply of vehicles' endothermic engines, in accordance with the provisions of the claims and with the aid of the attached drawing, in which FIG. 1 shows a schematic block view of the apparatus of the invention in a vehicle equipped with an endothermic engine.

DESCRIPTION OF THE PREFERRED EMBODIMENTS

In the aforesaid FIGURE it is pointed as whole with reference sign 1 a regasification apparatus of the invention, intended for supplying with fuel an endothermic engine M of a vehicle (not shown). Preferably, although not necessarily, said endothermic engine M is of the Otto cycle spark ignition type, applied to large industrial vehicles, such as trucks, buses, earth-moving machines and the like, as well as to agricultural tractors.

The apparatus 1, in a manner known per se, comprises at least one cryogenic cylinder H for storing, in liquid form, a fuel gas mixture, for example natural gas such as methane, and heating means C, placed along a pipe 3 connecting said cryogenic tank H with the engine's fuel supply system, said heating means being suitable for heating the fuel in liquid form, from the sub-zero temperature (−150/−160° C.) at which it is taken from the cryogenic tank, for example by means of a suitable pump 2, to bring it back to the gaseous state and to a temperature compatible with the power supply of the same engine M.

The apparatus 1, according to the invention, comprises a closed loop circulation assembly, 10, for circulating a heat transfer fluid, adapted for storing the cold energy extracted from the said fuel gas mixture during its heating for regasification.

The heat transfer fluid is an antifreeze liquid made, as a non-limiting example, of a mixture of water with a high content (20-50%) of ethylene glycol or other suitable substance to ensure that it remains in liquid phase, at atmospheric pressure, up to about −15° C.

The assembly 10 comprises the elements described below, enclosed within the dotted line K in the attached FIGURE.

In said elements, a first tank A is provided, suitable for containing, at ambient temperature, a volume of not less than 0.1 $m^3$, preferably higher than 0.2 $m^3$, of said antifreeze fluid in liquid phase.

From the first tank A, through a proper device 11, for example a valve, the antifreeze fluid flows, with controlled flow rate, into a first duct 12, which conveys to a fluid/fluid heat exchanger 13, which also defines in the present embodiment, said heating means C.

In said fluid/fluid heat exchanger 13, the antifreeze fluid exchanges heat with the cold branch of the aforementioned pipe 3 between the cryogenic cylinder H and the fuel supply system of the engine M, thereby undergoing a lowering of its temperature.

Advantageously, the fluid/fluid heat exchanger 13 is of the indirect type, providing a double circuit 13C inside it, in which an intermediate heat exchanger fluid is circulated, provided for exchanging heat between the cold fuel in liquid form and said antifreeze fluid. The intermediate heat transfer fluid is an inert pressurized gas, (for example, Nitrogen or Helium), a pure hydrocarbon or mixture of hydrocarbons thereof suitable for operating at a temperature lower than −150° C. without incurring in a phase change. At the same time, also the intermediate heat transfer fluid extracts heat from the antifreeze fluid without causing a phase change of the latter.

An insulated second pipe 14 exits from the fluid/fluid heat exchanger 13, for the transport of the cooled antifreeze fluid to an insulated second tank, B, for example with a double wall and adequately insulated to minimize heat transfer between the cold fluid contained therein and the external environment. The second tank B is also suitable for containing a volume of not less than 0.1 $m^3$, preferably larger than 0.2 $m^3$, of said antifreeze fluid in the liquid phase.

The second tank B is suitable to keep the cold antifreeze fluid stored as long as it is not required to be used (up to several hours).

From the second tank B departs at least one insulated derivative pipe 15, for conveying cold fluid to a user U1 present in the aforementioned vehicle, in which cooling action is required. In the accompanying FIGURE, the insulated derivative pipe 15 comprises a first branch 15A along which a delivery pump N is arranged, suitable for keeping a cold collector/distributor, D, moderately pressurized to which said first branch 15A leads. The cold collector/distributor D has advantageously multiple outputs: in the illustrated example, the second branch 15B of the aforementioned insulated derivative pipe 15 is connected to an output; similarly, other outputs are suitable to be connected with further insulated branches 16, 17, for conveying cold fluid to corresponding users U2, U3.

The utilities U1, U2, U3 and any others can be of various types, such as, for example, a cooling room for keeping refrigerated a load in the vehicle, the air-conditioning system of the cabin, cooling means for cooling mechanical organs and further more.

The insulated derivative pipe 15 is advantageously intended to serve a user U1, located in the aforementioned fuel supply system of the engine M, which is supercharged by a turbocharger G in this embodiment of the invention. The utility U1 is located downstream of an air/air heat exchanger F, or intercooler, provided in a known manner in the engine M, for a first cooling of the intake air. Said utility U1 is an air/fluid heat exchanger E, or aftercooler, in which the cold fluid coming from the second tank B performs a further and more accentuated cooling of the same combustion air entering the engine M. This allows to considerably increase the density of the air introduced into the engine M, thus improving its volumetric efficiency and, therefore, its performance.

From the utility U1, that is the air/fluid heat exchanger E (aftercooler), a third pipe 18 departs for conveying the fluid, heated back to ambient temperature, in said first tank A. In the present embodiment, in which there are several utilities, a hot collector L is associated with the third pipe 18, and the hot collector L receives the heat transfer fluid from several branches 18B, 18C for the return of the fluid flow from the respective users U2, U3. Between the utilities U1, U2 and U3 and the first tank A, the manifold L is interposed and, similarly, between the second tank B and the users U1, U2 and U3 the manifold D is interposed. Between the utilities and the two tanks there is not substantially any heat exchange.

In the apparatus 1, a programmable management system 20 is provided, schematically indicated by a dotted line in the attached diagram. The programmable management system 20, consisting of conventional electronic devices either hardware and software, is designed to control the parameters according to which the utility(ies) is (are) supplied with cold fluid. These parameters are calibrated to achieve the best time to time performance. In the presence of a plurality of users, the programmable management system 20 is adapted to control said cold collector/distributor D to manage the supply parameters of each utility. An interface between the programmable management system 20 and the operator can be located on board of the vehicle and, in addition or alternatively, include a remote device, connected in radiofrequency, for example a tablet, a smartphone or the like, capable of receiving and transmitting data from/to the system 20 itself. As a further possible embodiment, the programmable management system 20 is interfaced with at least one device located on board of the vehicle, for example a satellite navigator or a GPS, designed to provide specific information to the system 20 in real time, useful for the selection or the correction of the aforementioned supply parameters of an user. For example, depending on the planned route, traffic, weather conditions, expected time of arrival, or any other data that may serve the purpose, the programmable management system 20 can set the optimal cold energy supply parameters for each utility (engine operation, refrigeration of the load, air conditioning of the passenger compartment, cooling of mechanical members and even more).

From the above description, it is intuitive to understand the peculiar characteristics of the regasification apparatus proposed with the present invention, which combines the primary function of supplying vehicle's endothermic engines with a fuel which is a mixture of combustible gas previously stored in liquid form in a cryogenic cylinder, together with the functions of: storing the cold energy extracted from the fuel during the regasification process in an antifreeze fluid; managing the stored cold energy; and supplying the stored cold energy in a delayed manner to one or more users on board of the vehicle according to variable and selectable modes. It is done by an optimisation procedure, managed on board of the vehicle based on the artificial intelligence and on the collection of external data (position, traffic, weather conditions etc.) and on self learning.

Thanks to the technical solution providing a closed loop heat transfer fluid circuit comprising a cold and a hot tank, it is possible to extract the maximum amount of cold energy from the fuel and keep it stored with a low heat loss. The use of an antifreeze fluid as the heat transfer fluid allows a heat exchange without using a phase change fluid and thus a great simplification of the closed loop heat transfer fluid circuit. Moreover, the first tank A and the insulated second tank B are materially and thermally completely separated from the utilities U1, U2 and U3, so that the cold energy can be stored for a delayed use. Thanks to the presence of the hot and cold collectors L and D placed between the tanks A and B and the utilities U1, U2, and U3, it is possible to manage a plurality of utilities in order to optimize the exploitation of the cold energy stored in the second tank B.

Indicatively, for a commercial truck with power output in the range 200-300 kW, the two tanks A and B have advantageously a capacity of 0.25-0.5 m$^3$ each, corresponding to a stored cold energy estimated between 7 and 14 KWh, which can be accumulated in about 1-2 hours of operation of the engine through the heat exchanger 13. Then, the stored cold energy can be distributed at any time to the utilities that need it. In particular, the management system 20 is configured to decide the use of the cold energy on the basis of the cooling requirements of the loads, that are largely a priori programmable. Furthermore, the supply of cold energy to the aftercooler E, which is conveniently activated depending on the performance and working regime required to the engine M, can be determined automatically by the management system 20 itself as a function of settable parameters such as the vehicle's weight, load conditions and also thanks to the presence on board of communication devices that allow to obtain information on the route to be taken such as, for example, the slopes to be overcome, the average speeds, the traffic along the route, the weather conditions, in order to predict the engine operating regimes and, therefore, the need for activation of the aftercooler E.

Advantageously, by combining the programmable management system whose potentials and functions are certainly larger than the ones described as a non-limiting example, the use of the stored cold energy can be calibrated according to the real need of the user, with the least waste possible, so as to obtain, on the whole, a high cold energy exploitation efficiency. It is also possible to combine a control system with self-learning functions that are able, especially under repetitive service conditions such as those occurring in public transport or planned logistics, to setup and adjust the working parameters to optimize the use of cold energy.

To this end, the ability of connecting the managing system 20 with remote devices such as smartphones and the like, and/or with on-board systems able to interact with the apparatus of the invention are useful to optimize the operation of the apparatus itself.

However, it is understood that the above description has an exemplifying and non-limiting value, therefore any variants of details of components of the described apparatus that may be necessary for technical and/or functional reasons are considered from now on falling within the same protective scope defined by the following claims.

The invention claimed is:

1. A regasification apparatus for a supply of a vehicle's endothermic engine of the type in which there is provided at least one cryogenic cylinder for the storage, in liquid form, of a fuel gas mixture, beating means interposed along a fuel supply pipe connecting the cryogenic cylinder to the fuel supply system of the engine, operable to heat the fuel gas mixture in liquid form from a sub-zero temperature from which it is taken, to bring it back to a gaseous state at a temperature compatible with the fuel supply system of the engine, and a closed loop circulation assembly where a heat transfer fluid is circulated, for the storage of cold energy extracted from the fuel gas mixture during a heating phase, comprising: a first tank, adapted to store, at ambient temperature, a volume not less than 0.1 m$^3$ of the heat transfer fluid in liquid phase; means for the withdrawal, with a controlled flow rate, of the fluid from the first tank and for flowing it through a first pipe; a fluid/fluid heat exchanger, defining the heating means and located downstream of the first pipe between the cryogenic cylinder and the fuel supply system of the engine, in which the heat transfer fluid exchanges heat with a cold branch of the fuel supply pipe, thereby lowering its temperature; an insulated second tank adapted to store a volume not less than 0.1 m$^3$ of the heat transfer fluid in liquid phase; an insulated second pipe, at an output of the fluid/fluid heat exchanger, for conveying the cooled heat transfer fluid to the second tank: at least one insulated derivative piping connected to the second tank for receiving the cold heat transfer fluid and conveying it to at least one of a plurality of utilities present in the vehicle in which a cooling action is required, the at least one utility being not in thermal contact with the first tank and second tank and a third pipe, placed downstream of the at least one utility, for returning the heat transfer fluid, heated back to ambient temperature, into the first tank.

2. The regasification apparatus according to claim 1, wherein the fluid/fluid heat exchanger is of the indirect type, providing a double circuit inside it, in which an intermediate heat exchanger fluid is circulated, provided for exchanging heat between the fuel gas mixture in liquid state and the heat transfer fluid.

3. The regasification apparatus according to claim 1, further comprising a heat transfer fluid circulating in the closed loop circulation assembly, the heat transfer fluid being an antifreeze liquid which is in liquid phase at ambient pressure and at a temperature of −15° C.

4. The regasification apparatus according to claim 3, wherein the antifreeze liquid is a mixture of water and ethylene glycol operable to keep the antifreeze fluid in the liquid state up to at least a temperature of −15° C., and wherein the intermediate heat transfer fluid is a pressurized inert gas including nitrogen, helium, a hydrocarbon or mixtures thereof, operable to work at a temperature equal or lower than −150° C. without incurring in a phase change.

5. The regasification apparatus according to claim 1, further comprising a programmable management system operable to define control parameters according to which the cold heat transfer fluid is supplied to the at least one utility.

6. The regasification apparatus according to claim 5, wherein the programmable management system is interfaced by least one remote device provided for receiving and transmitting data from or to the programmable management system.

7. The regasification apparatus according to claim 6, wherein the utility is an air/fluid heat exchanger or aftercooler placed downstream an air/air heat exchanger of the engine, wherein the programmable management system is adapted to control the supply of the cold heat transfer fluid from the second tank to the utility, so as to enable activation of the aftercooler, as a function of settable parameters including the vehicle's weight, load conditions and information from on board or the at least one remote device about the route, traffic, weather conditions, or expected time of arrival received from the at least one remote device operable for setting optimal parameters for the operation of the engine.

8. The regasification apparatus according to claim 5, wherein programmable management system is interfaced with at least one device located on board of the vehicle, operable to provide specific information to the management system useful for defining or correcting the control parameters according to which the cold fluid is supplied to the at least one utility.

9. The regasification apparatus according to claim 5, wherein the insulated derivative piping comprises a cold collector or distributor and the third pipe comprises a hot collector, wherein the plurality of utilities are included between the cold collector or distributor and the hot collector, wherein the programmable management system is operable for controlling the cold collector or distributor to manage the supply of the cold heat transfer fluid to each of the plurality of utilities.

10. The regasification apparatus according to claim 1, wherein each of the first tank and second tank is adapted to contain a volume of the heat transfer fluid in a range of 0.25 $m^3$ to 0.5 $m^3$.

* * * * *